(12) United States Patent
Shinohara et al.

(10) Patent No.: US 6,587,137 B2
(45) Date of Patent: Jul. 1, 2003

(54) LIGHT BEAM SCANNING DEVICE

(75) Inventors: Tadashi Shinohara, Kanagawa (JP);
Kenichi Ono, Tokyo (JP); Shinji Kobayashi, Tokyo (JP); Kohji Oshikiri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/925,657

(22) Filed: Aug. 10, 2001

(65) Prior Publication Data

US 2002/0021351 A1 Feb. 21, 2002

(30) Foreign Application Priority Data

Aug. 11, 2000 (JP) ........................... 2000-245089

(51) Int. Cl.⁷ ............................... B41J 2/435
(52) U.S. Cl. ...................... 347/235; 347/250
(58) Field of Search ....................... 347/235, 234, 347/248, 250, 116

(56) References Cited

U.S. PATENT DOCUMENTS

| | | | |
|---|---|---|---|
| 4,845,358 A | 7/1989 | Asada | 250/235 |
| 5,621,221 A | 4/1997 | Shinohara et al. | 250/576 |
| 5,737,665 A | 4/1998 | Sugiyama et al. | 399/39 |
| 5,765,083 A | 6/1998 | Shinohara | 399/301 |
| 5,875,380 A | 2/1999 | Iwata et al. | 399/301 |
| 5,899,597 A | 5/1999 | Shinohara et al. | 399/64 |
| 5,943,086 A | 8/1999 | Watabe et al. | 347/235 |
| 5,962,783 A | 10/1999 | Iwata et al. | 73/488 |
| 5,963,240 A | 10/1999 | Shinohara et al. | 347/116 |
| 6,005,243 A | 12/1999 | Yamazaki | 250/234 |
| 6,118,557 A | 9/2000 | Sugiyama et al. | 358/504 |
| 6,128,459 A | 10/2000 | Iwata et al. | 399/301 |
| 6,282,396 B1 | 8/2001 | Iwata et al. | 399/301 |
| 6,295,435 B1 | 9/2001 | Shinohara et al. | 399/301 |
| 6,380,960 B1 | 4/2002 | Shinohara | 347/116 |
| 6,381,435 B2 | 4/2002 | Shinohara et al. | 399/301 |
| 6,507,720 B2 | 1/2003 | Kabumoto et al. | 399/258 |

FOREIGN PATENT DOCUMENTS

| | | |
|---|---|---|
| JP | 3-274015 | 12/1991 |
| JP | 2880120 | 1/1999 |

*Primary Examiner*—Hai Pham
(74) *Attorney, Agent, or Firm*—Oblon, Spivak, McClelland, Maier & Neustadt, P.C.

(57) ABSTRACT

A signal is generated which is active only during an interval of taking one pulse of a series of output pulses of said synchronization detecting sensor, but is not active during an interval of taking more than one pulse thereof. Then, synchronization detection pulses are separated from the pulses output by the synchronization detecting sensor for the respective colors by using the thus-generated signal.

16 Claims, 11 Drawing Sheets

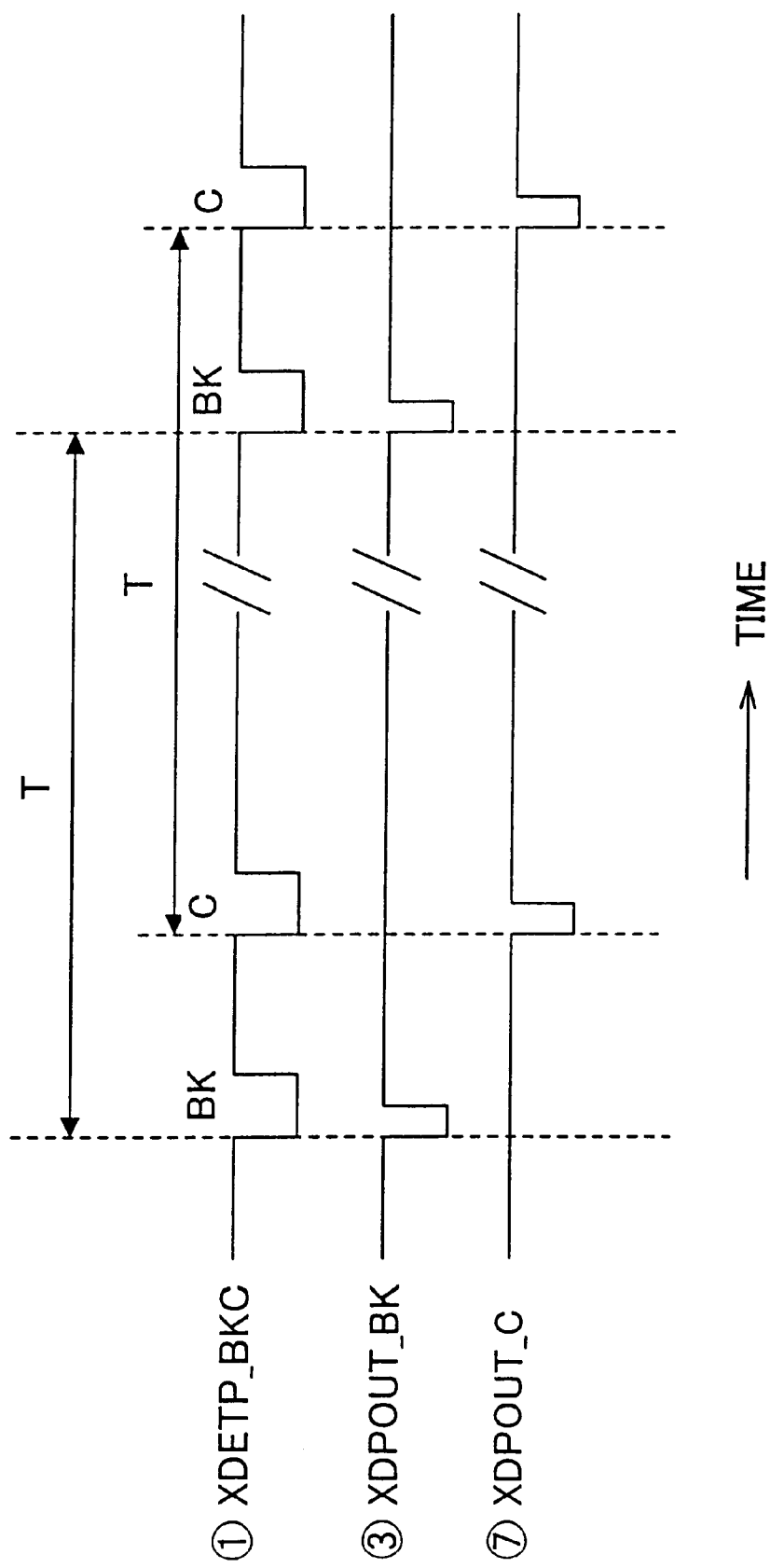

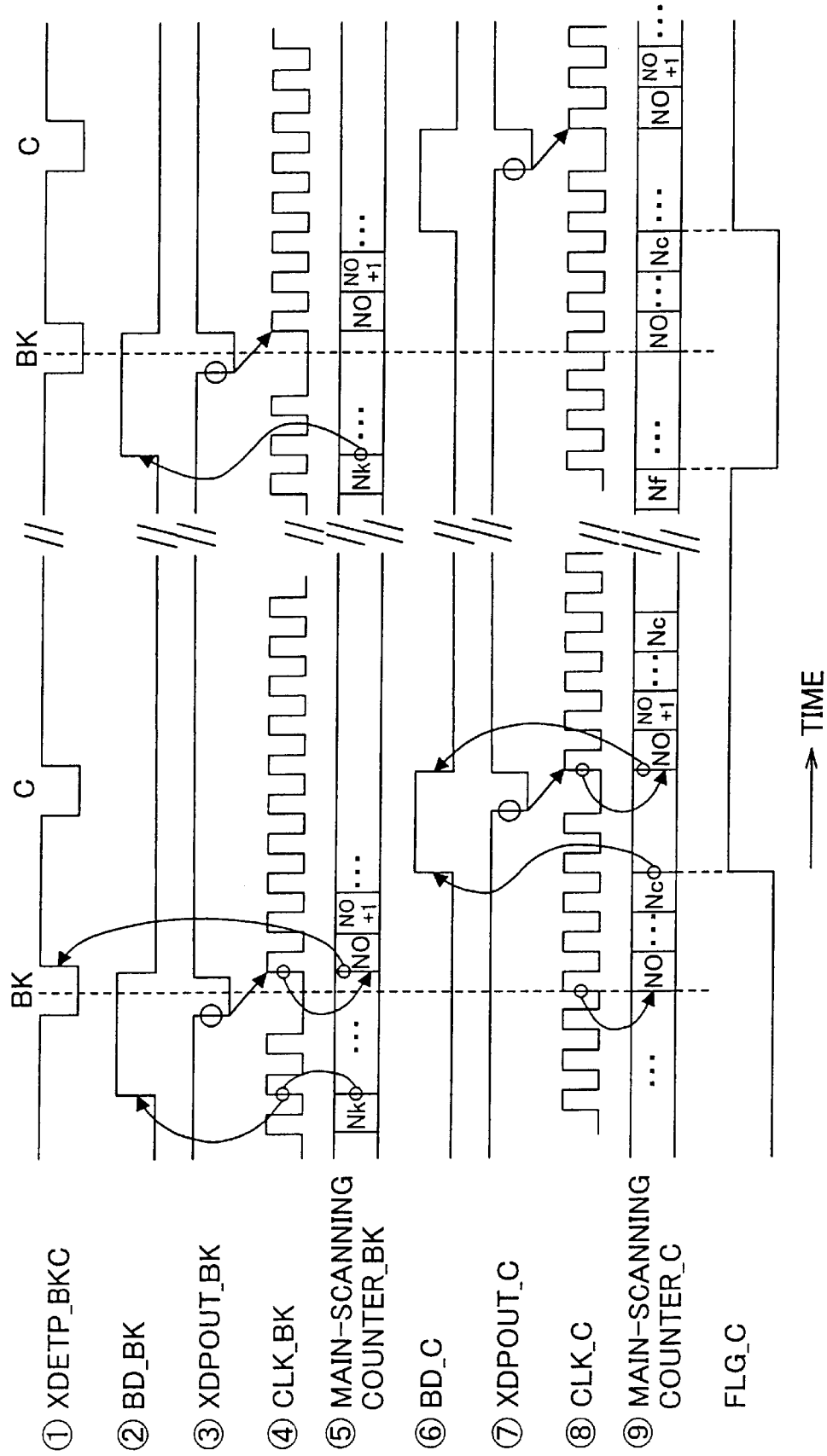

FIG.8

| PMMNT_BK | PMMNT_C |
|----------|---------|
| H | H | → NORMAL
| H | L | → C-ABNORMAL
| L | L | → BK-ABNORMAL

LIGHT BEAM SCANNING DEVICE

BACKGROUND OF THE INVENTION

1. Field of the Invention

The present invention generally relates to a light beam scanning device used in a copier, a printer, a facsimile apparatus or the like in an electrophotographic system or an electrostatic recording system.

2. Description of the Related Art

As related arts in this field, for example, Japanese Laid-Open Patent Application No. 3-274015 discloses a method in which synchronization detection signal of two beams is decomposed and distributed, and, states of the two beams are determined by using timer means, and, Japanese Patent No. 2880120 discloses a method of gating a synchronization detection signal by a synchronization detection modulating signal.

However, the related art disclosed by Japanese Laid-Open Patent Application No. 3-274015 relates to a method to be applied to an image forming apparatus of a single color in which scanning on two lines is performed simultaneously. Accordingly, this method cannot be applied to a color image forming apparatus in which scanning is performed for a plurality of colors of lines in an order of the respective colors (color components).

SUMMARY OF THE INVENTION

The present invention is devised in order to solve the above-mentioned problem, and, an object of the present invention is to provide a light beam scanning device by which, even when beams of more than one color (color component) are applied to a common synchronization detecting sensor, output pulse series of the synchronization detecting sensor can be positively classified/separated into synchronization detection pulses of the respective color components.

A light beam scanning device according to the present invention for scanning a recording medium (photosensitive body) by a light beam so as to perform recording of information thereon, includes:

a synchronization detecting sensor to which light beams of a plurality of colors are applied with difference in time;

a signal generating circuit which generates a signal which is active only during an interval of taking one pulse of a series of output pulses of the synchronization detecting sensor, but is not active during an interval of taking more than one pulse thereof; and a signal separating circuit which separates a synchronization detection pulse for each color only when the signal generated by the signal generating circuit is active.

Thereby, it is possible to employ a synchronization detecting sensor which is common for a plurality of colors (color components). Accordingly, the costs can be effectively reduced.

The signal generated by the signal generating circuit may be a synchronization detection beam-turning-on signal for each color.

The separating circuit may be provided for each color, and has a same circuit configuration, and, each separating circuit has information externally set for indicating an order of the colors (color components) in the series of pulses output from the synchronization detecting sensor so as to take a pulse thereof corresponding to a respective one of the colors. Thereby, as the common circuit configuration can be used for the respective separating circuits, the costs can be effectively reduced.

The synchronization detection beam-turning-on signal for the advancing first color may become active when a first main-scanning counter counts a first predetermined number, and, may become inactive when an initial value is loaded into the first main-scanning counter by the synchronization detection pulse corresponding to the first color; and by the synchronization detection pulse corresponding to the first color, a second main-scanning counter for the subsequent second color may be loaded with an initial value, and the synchronization detection beam-turning-on signal for the second color may become active when the second main-scanning counter counts a second predetermined number, and, may become inactive when the initial value is loaded into the second main-scanning counter by the synchronization detection pulse corresponding to the second color.

In this configuration, as only initialization of the main-scanning counter of the subsequent color is made by the pulse of the advancing color, the costs can be effectively reduced.

A beam of which color has an error may be detected by using the synchronization detection pulse corresponding to each color.

Thereby, it is possible to prevent an abnormal image from being formed due to erroneous or lack of proper beam generation.

When the synchronization detection pulse corresponding to the advancing first color has an error, the synchronization detection pulse corresponding to the subsequent second color may be prevented from being output. Specifically, when the first pulse of the pulse series is not output, all the other pulses thereof are not output from the separating circuit(s).

Thereby, even when error occurs in synchronization detection signal successively for different colors (color components), detection of the error can be performed properly.

While the synchronization detection pulse corresponding to the subsequent second color is not output, the second synchronization detection beam-turning-on signal may be made inactive when the second main-scanning counter counts a predetermined error-detection number.

Thereby, it is possible to prevent an abnormal image from being formed due to erroneous or lack of proper beam generation.

Each separating circuit may output synchronization detection pulses selectively of one of single-beam system and a multi-beam system according to a set number of beams.

Thereby, it is possible to utilize the device for both a single-beam system and a multi-beam system, and to effectively reduce the costs.

Other objects and further features of the present invention will become more apparent from the following detailed description when read in conjunction with the accompanying drawings.

BRIEF DESCRIPTION OF THE DRAWINGS

FIG. 2 shows a timing chart of one example of synchronization detection signals of the above-mentioned light beam scanning device in the embodiment of the present invention;

FIG. 3 shows a timing chart of essential signals of the above-mentioned light beam scanning device in the embodiment of the present invention;

FIG. 8 illustrates a method of determining of error by using the above-mentioned abnormality detection flags:

DETAILED DESCRIPTION OF THE PREFERRED EMBODIMENT

Figure 1:
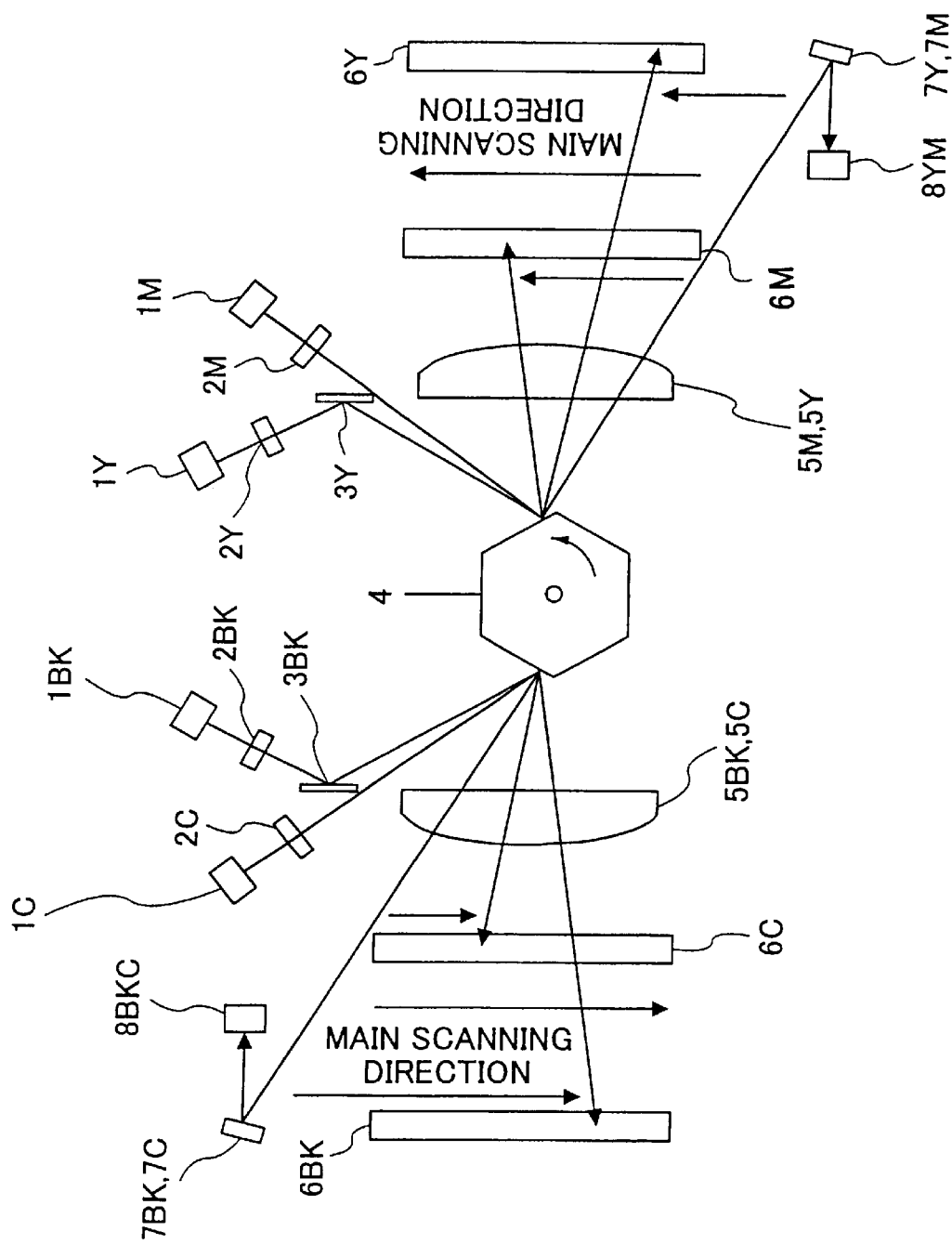
FIG. 1 shows a configuration (disposition) of a light beam scanning device in one embodiment of the present invention.
Figures 4A, 4B:
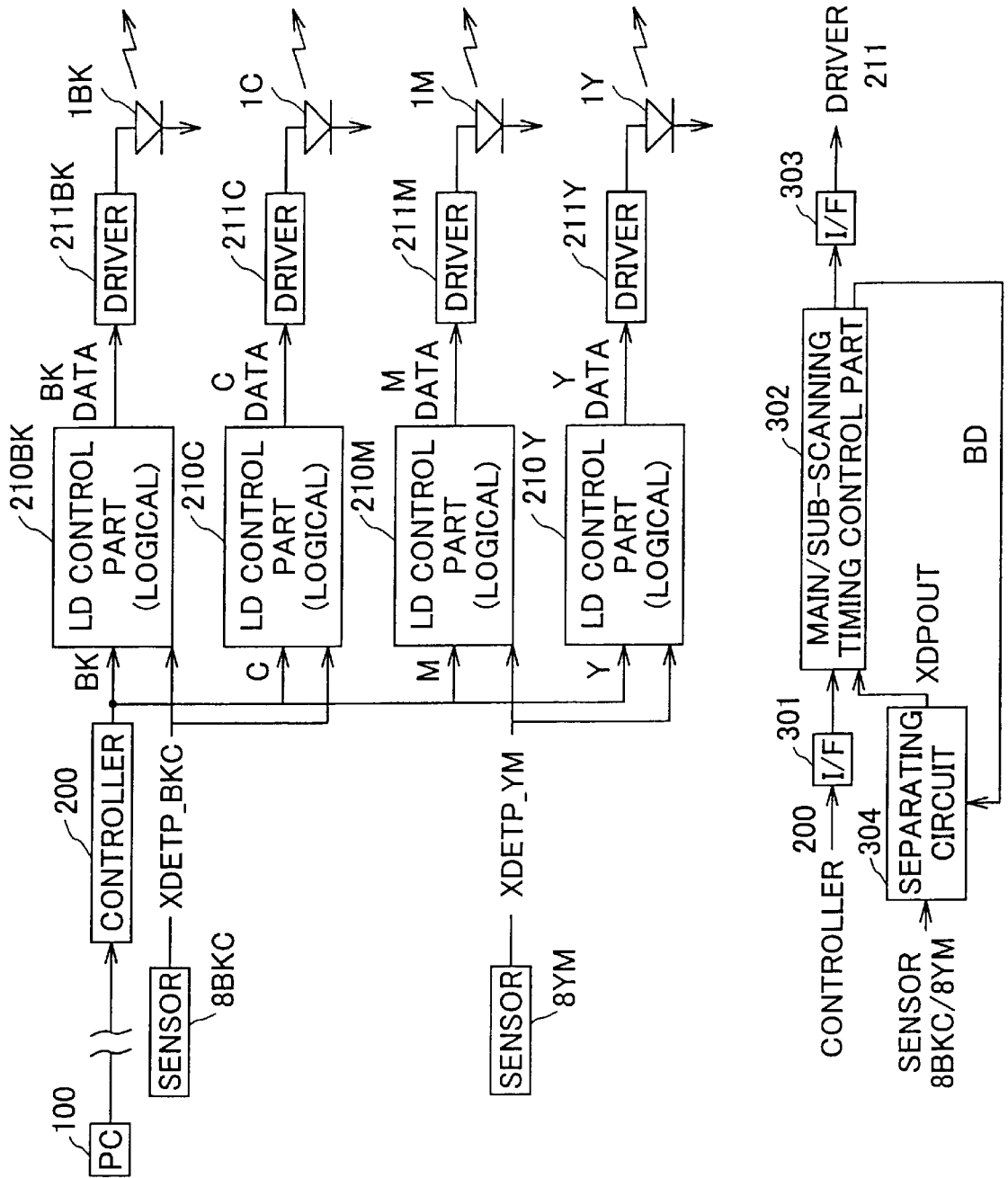
FIG. 4A shows a block diagram illustrating a control part of the above-mentioned light beam scanning device in the embodiment of the present invention.
FIG. 4B shows an internal block configuration of a LD control part shown in FIG. 4A.
Figure 5:
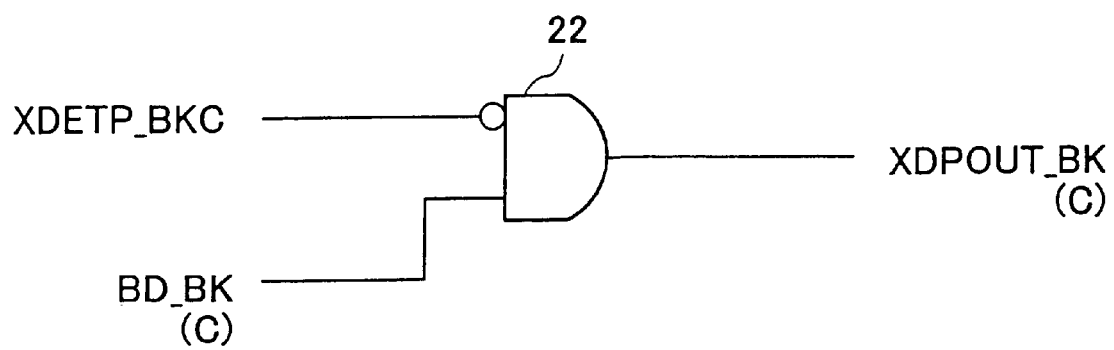
FIG. 5 shows a circuit diagram illustrating an essential part of a separating circuit shown in FIG. 4B.
Figure 6:
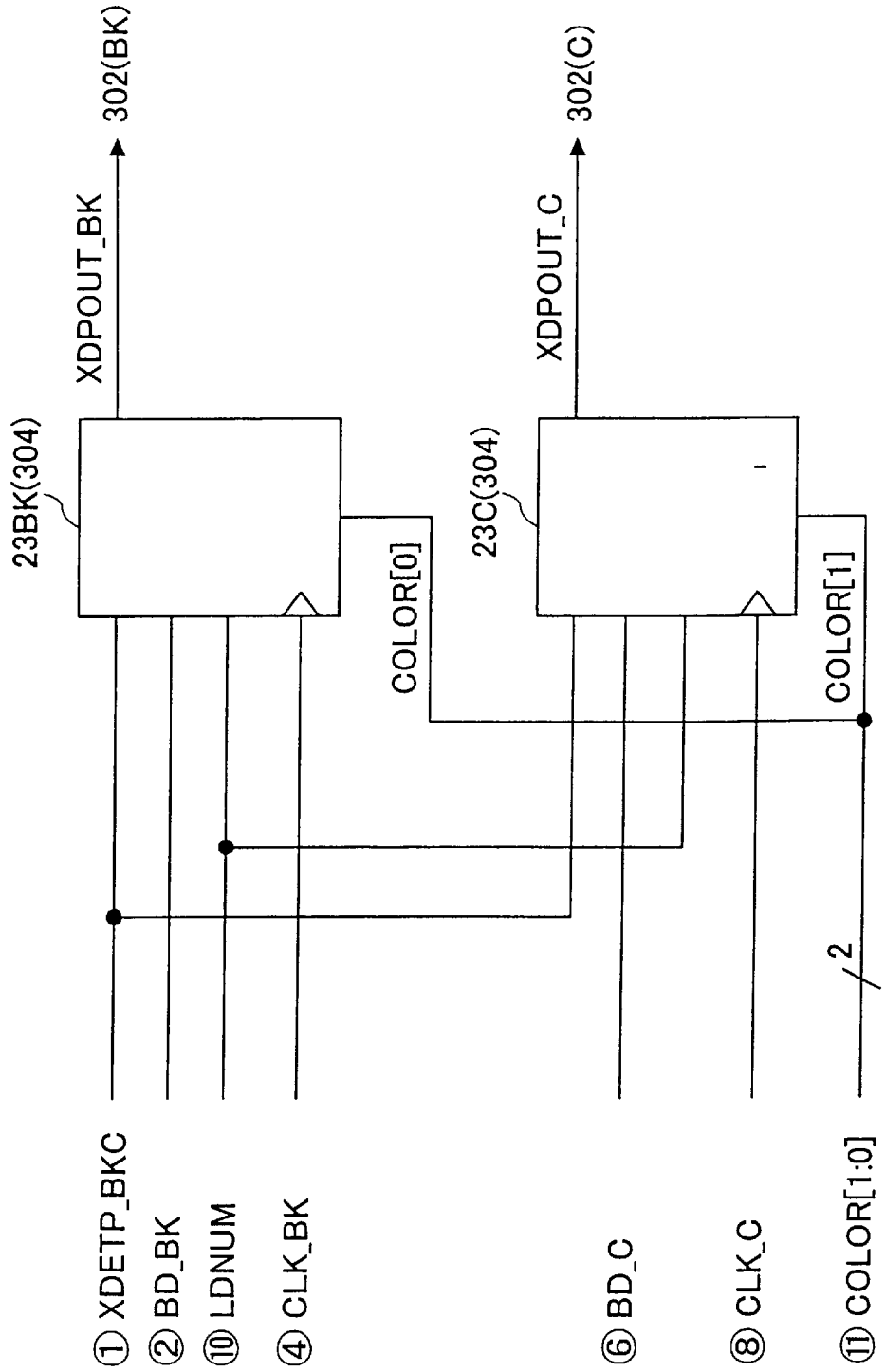
FIG. 6 shows a circuit diagram the illustrating separating circuits shown in FIG. 4B.
Figure 7:
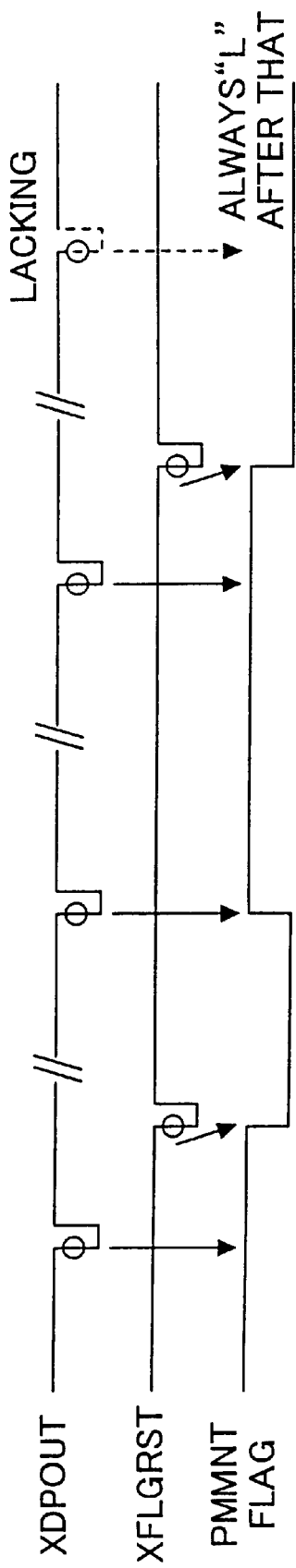
FIG. 7 shows a timing chart illustrating an abnormality detection flag according to the present invention.
Figure 9:
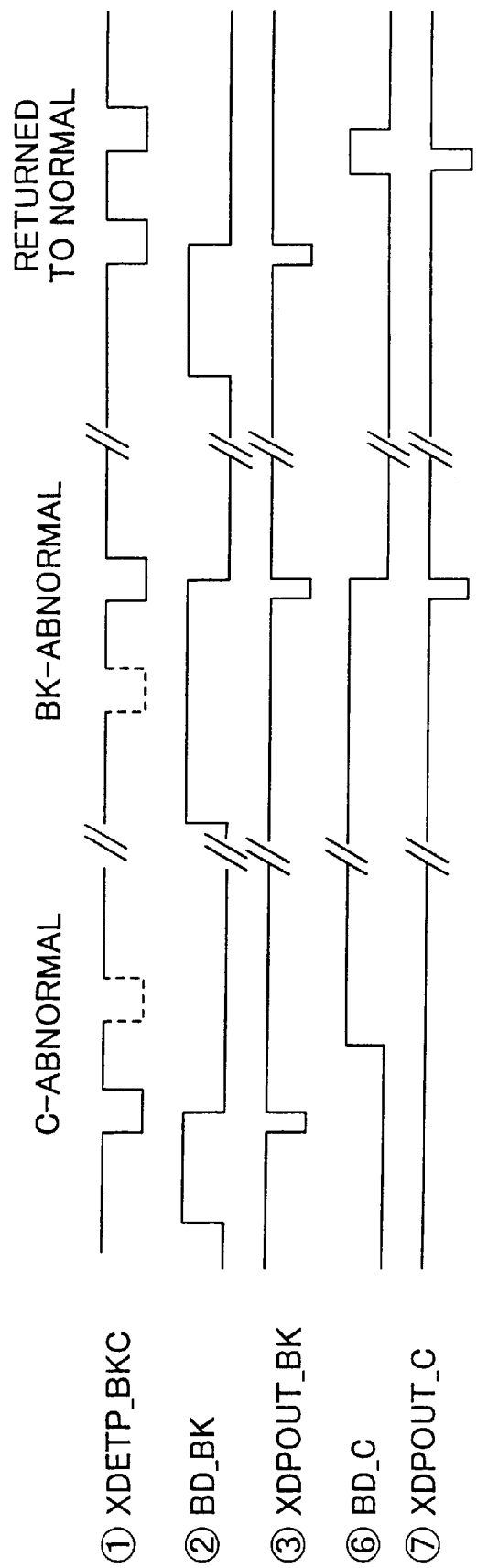
FIGS. 9 and 10 show timing charts for illustrating processing performed when an error occurs in beam generation.
Figure 10:
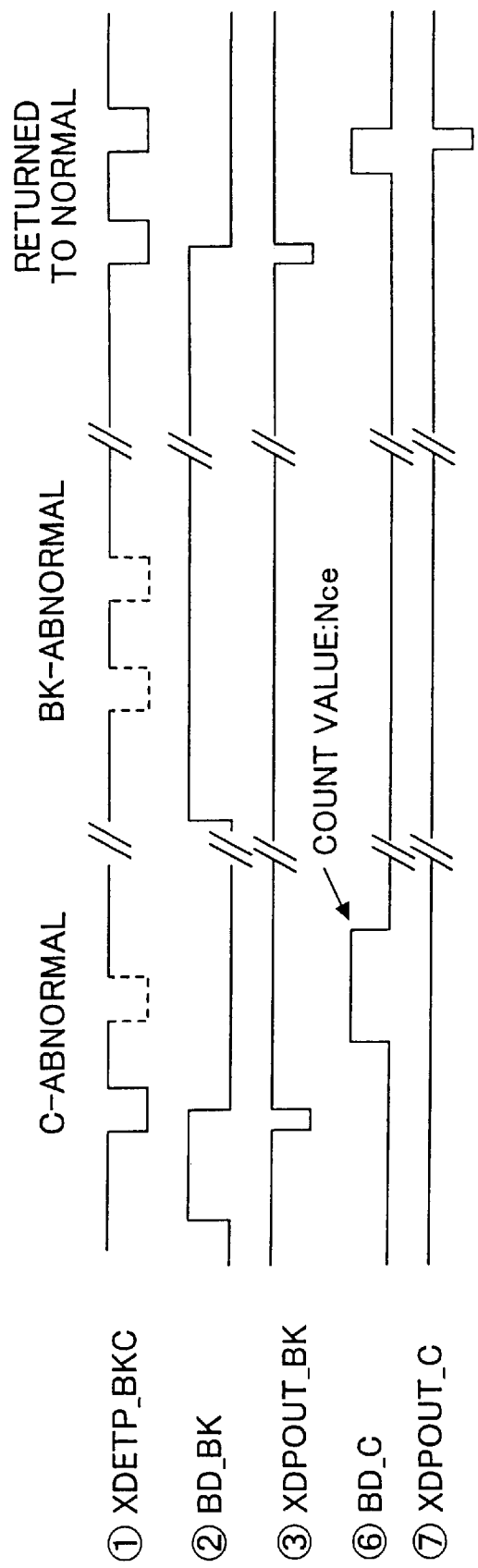
Figure 11:
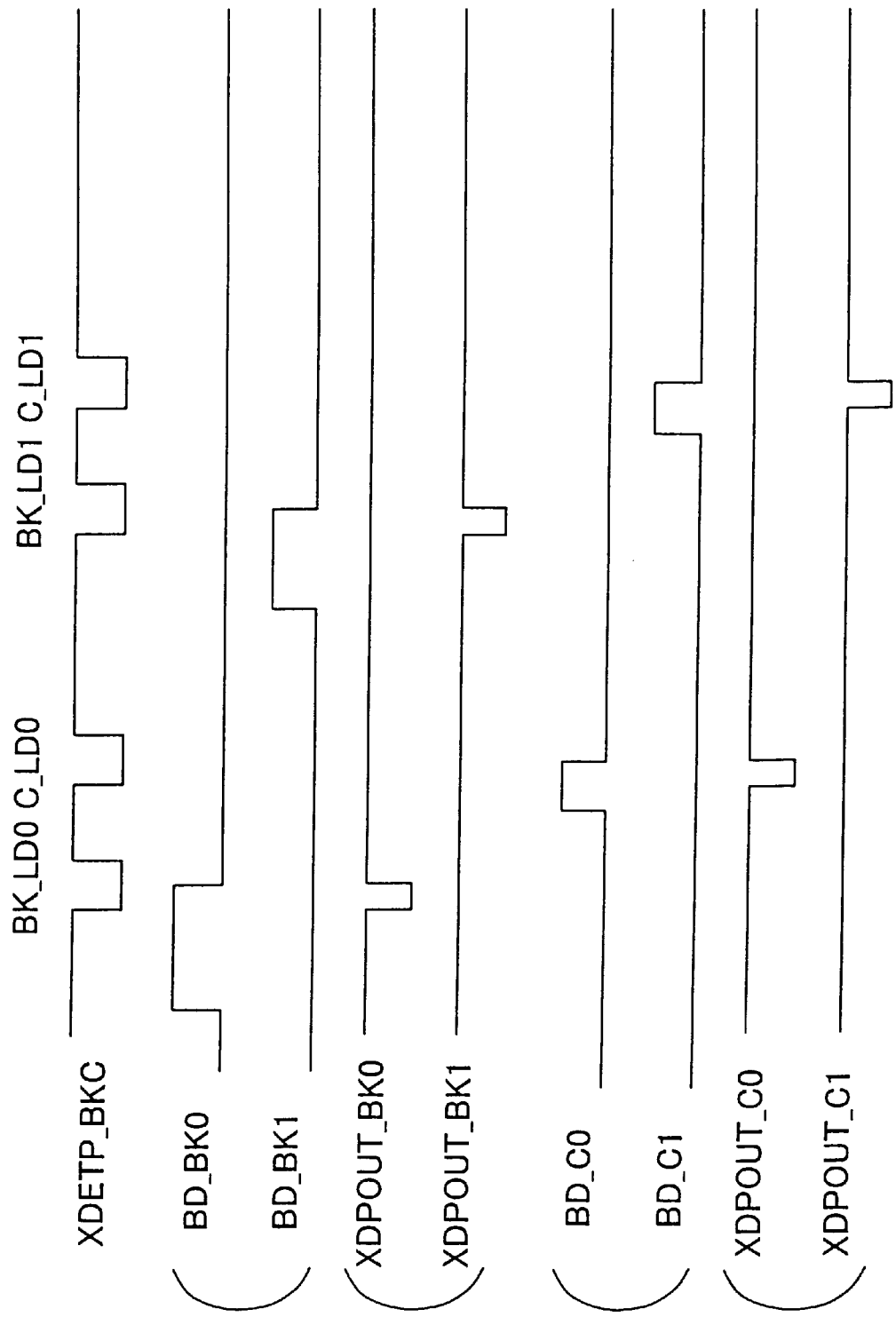
FIG. 11 shows a timing chart of essential signals when a two-beam mode is set in the separating circuits shown in FIG. 6.

FIG. 1 shows a configuration of a light beam scanning device in one embodiment of the present invention. FIG. 2 shows a timing chart of one example of synchronization detection signals. FIG. 3 shows a timing chart of essential signals of the above-mentioned light beam scanning device. FIG. 4A shows a control part of the above-mentioned light beam scanning device. FIG. 4B shows a block diagram of each of LD control parts shown in FIG. 4A. FIGS. 5 and 6 show circuits of separating synchronization detection signals of the control circuit shown in FIGS. 4A and 4B. FIG. 7 shows a timing chart of an abnormality detection flag. FIG. 8 illustrates determination results by using the abnormality detection flag. FIGS. 9 and 10 show timing charts for illustrating processing performed at a time of occurrence of abnormality. FIG. 11 shows a timing chart of essential signals in a case where a two-beam mode is set in the separating circuit shown in FIG. 6.

FIG. 1 shows a plan view of the light beam scanning device in which four color components, i.e., black (BK), cyan (C), magenta (M) and yellow (Y) are used, four beams of the respective color components are thus used, and four photosensitive bodies for the respective color components are used. Light beams emitted from LD units 1BK and 1C of black and cyan pass through cylinder lenses 2BK and 2C, respectively. Then, the BK beam is reflected by a reflection mirror 3BK, and then applied to a polygon mirror 4 which is common for the four color components, while the C beam is directly applied thereto, on the left reflective surface thereof. Then, as the polygon mirror 4 rotates, the BK beam and C beam are deflected thereby in a main scanning direction, then, pass through fθ lenses 5BK and 5C, and are reflected by mirrors 6BK and 6C, respectively. Thereby, these beams are applied to the photosensitive bodies for BK and C (not shown in the figure), respectively.

Similarly, light beams of M and Y emitted from LD units 1M and 1Y of magenta and yellow pass through cylinder lenses 2M and 2Y, respectively. Then, the M beam is reflected by a reflection mirror 3M, and then applied to the polygon mirror 4 which is common for the four color components, while the Y beam is directly applied thereto, on the right reflective surface thereof. Then, as the polygon mirror 4 rotates, the M beam and Y beam are deflected thereby in a main scanning direction, then, pass through fθ lenses 5M and 5Y, and are reflected by mirrors 6M and 6Y, respectively. Thereby, these beams are applied to the photosensitive bodies for M and Y (not shown in the figure), respectively.

Thereby, electrostatic latent images of the respective color components BK, C, M and Y are formed on the respective photosensitive bodies through scanning thereof by using the thus-applied beams of the respective color components. Then, a transfer paper is made to come into contact with the respective photosensitive bodies, sequentially, and then, through a well-known transferring technique, the thus-formed latent images of the respective color components are transferred to the transfer paper, sequentially. Thereby, on the transfer paper, the images of the respective color components are overlaid with each other, and, thus, a full-color image is formed on the transfer paper, through an well-known technique.

Cylinder mirrors 7BK and 7C and a synchronization detecting sensor 8BKC which is common for the two color components black BK and cyan C are provided on the upstream side of a position at which writing/scanning by the BK beam and C beam is started. Similarly, cylinder mirrors 7M and 7Y and a synchronization detecting sensor 8YM which is common for the two color components magenta M and yellow Y are provided on the upstream side of a position at which writing/scanning by the M beam and Y beam is started. These synchronization detecting sensors 8BKC and 8YM are synchronization detecting sensors for performing synchronization in the main scanning direction. As two color components are applied to each of the sensors 8BKC and 8YM as mentioned above, timing at which the respective color components are applied to the sensor is made different from one another as a result of the angles at which the beams of the respective color components are applied to the polygon mirror 4 being made different from one another. Thus, two pulses corresponding to the beams of the respective two color components are output from each sensor sequentially. As can be seen from the figure, the main scanning direction in which scanning is made for the color components BK and C are reverse to the main scanning direction in which scanning is made for the color components M and Y.

A method/form according to the present invention of classifying/separating output of the synchronization detecting sensor, which is common for two color components, for the respective color components will now be described with reference to the color components of BK and C. However, as the substantially the same manner can be applied for the color components Y and M, description thereof is omitted. In FIG. 2, an XDETP_BKC signal is a signal output from the above-mentioned synchronization detecting sensor 8BKC, and, includes a series of pulses BK and C corresponding to the BK and C beams, respectively. The advancing pulse BK is a synchronization detection signal generated by the BK beam, and the subsequent pulse C is a synchronization detection signal generated by the C beam. According to the present invention, the XDETP_BKC signal is classified/separated into a XDPOUT_BK signal and a XDPOUT_C, shown in the figure, for the respective color components BK and C, by the manner which will now be described. In the figure, T denotes a main scanning period.

In FIG. 4A, the above-mentioned light beam scanning device in the embodiment of the present invention includes a controller 200 which receives an image signal from a mother apparatus such as a PC (personal computer) 100, analyses it, and generates image data of the respective color components BK, C, M and Y, LD control parts 210BK, 210C, 210M and 210Y which receive the image data of the corresponding color components, respectively, from the controller 200, and drivers 211BK, 211C, 211M and 211Y which receive image data of the corresponding color components provided by the LD control part 210BK, 210C, 210M and 210Y, respectively, and, in accordance therewith, drive the respective LD units 1BK, 1C, 1M and 1Y, shown in FIG. 1, respectively.

FIG. 4B shows a part of each of the LD control parts 210BK, 210C, 210M and 210Y shown in FIG. 4A, which part controls timing of scanning of main and sub-scanning directions performed by the light beam scanning device, and, thus, controls timing of sending out image data given by the controller 200 through an interface 301 according to a timing signal given by a separating circuit 304. Then, the image data is output to the driver 211 BK, 211C, 211M or 211Y, shown in FIG. 4A, through an interface 303 in the thus-controlled timing. Thereby, the driver 211BK, 211C, 211M or 211Y drives the LD unit 1BK, 1C, 1M or 1Y according to the image data of each color component in proper timing such that a corresponding electrostatic latent image is formed on the corresponding photosensitive body at proper pixel position thereon in the main scanning direction. As a result, the images of the respective color components are properly overlaid on the transfer paper, and, a high-quality full-color image is obtained. For this purpose, each LD control part 210BK, 210C, 210M or 210Y, in particular, a main/sub-scanning timing control part 302, should start provision of image data of each color component to the driver 211BK, 211C, 211M or 211Y with a delay from the time at which the sensor 8BKC or 8YM outputs the synchronization detection signal (XDPOUT) of the corresponding color component by a predetermined time interval, and, thereby, the relevant line of the image data is drawn on the corresponding photosensitive body at proper position thereof.

FIG. 3 shows the timing chart of operation of separating/classifying the XDETP_BKC signal into the XDPOUT_BK signal and XDPOUT_C signal performed by the separating circuits 304 shown in FIG. 4B of the LD control parts 210BK and 210C shown in FIG. 4A. In order to perform the separating operation, an AND gate 22 shown in FIG. 5 is used, and, thereby, pulses of the XDETP_BKC signal are taken only during time intervals in which a BD_BK signal and a BD_C signal (BD in FIG. 4B) which are synchronization detection beam-tuning-on signals for BK and C and turn on the LD units 1BK and 1C, respectively, for the timing detection through the sensor 8BKC, are active, respectively. For this purpose, these BD_BK and BD_C signals are such that each signal is active for taking only one pulse at a time, but is not active for taking more than one pulse at a time.

FIG. 6 shows the block diagram of the above-mentioned separating circuits 304 shown in FIG. 4B which are those of the LD control parts for BK and C, and, in FIG. 6, have reference numerals 23BK and 23C given thereto, respectively. In FIG. 6, the same signals as those of FIG. 3 have the same reference numerals given thereto. The separating circuits 23BK and 23C are the same circuits, and are mounted on separate substrates. Respective bits of a COLOR signal [1:0] are input to the separating circuits 23BK and 23C, respectively, as information signals representing an order of color components of the pulse series. Thereby, the order of color components of the pulse series is set such that BK is an advancing color component, and C is a subsequent color component. Further, the AND gate 22 shown in FIG. 5 is built in, in each of the separating circuits 23BK and 23C.

A method of generating the above-mentioned BD_BK signal and BD_C signal (synchronization detection beam-turning-on signals) through the main/sub-scanning timing control parts 302 of the LD control parts 210BK and 210C shown in FIGS. 4A and 4B will now be described, with reference FIG. 3. In a case of BK (advancing color component), the BD_BK signal becomes active in synchronization with a CLK_BK signal which is a pixel clock of BK, when a value (count value) of a main-scanning counter_BK (signal for counting pulses of the CLK_BK signal) becomes a predetermined value Nk. Then, this signal BD_BK becomes inactive when an initial value N0 is loaded into the main-scanning counter_BK by a pulse of the CLK_BK signal, which is made in phase with a decaying edge of the XDPOUT_BK signal. Thereby, the LD unit 1BK shown in FIG. 1 is turned off, and, as a result, the XDETP_BKC signal can have an "H" level. This operation is performed for each line (main scanning).

Thus, as long as the polygon mirror 4 rotates approximately at a fixed rotation velocity, the BK beam emitted from the LD unit 1BK and then deflected by the polygon mirror 4 is applied to the sensor 8BKC with an approximately fixed delay time from a time at which the same beam was applied thereto precedingly. Thereby, by making the BD_BK signal active after counting the predetermined number (N0 through Nk) of pulses of the CLK_BK so as to turning on the LD unit 1BK and also to open the gate 22 at the same time, the BK beam can be detected by the sensor 8BKC. Then, after that, by making the BD_BK signal inactive (low level) immediately after the CLK_BK is made in phase with the thus-generated low-level pulse of the XDPOUT_BK signal, the AND gate 22 is closed, and, as a result, the subsequent pulse (caused by the beam C) of the XDETP_BKC is not taken as the XDPOUT_BK. Then, by using an appropriate count value of the main-scanning counter_BK, image data is sent out from the main/sub-scanning timing control part 302 of the LD control part 210BK in proper timing as mentioned above.

When the light beam scanning device is started, first, the LD unit 1BK is forcibly driven, and the BK beam is emitted therefrom by making the BD_BK signal is made active forcibly, after rotation of the polygon mirror 4 is started, and, then, is stabilized. As a result, when a low-level pulse of the XDETP_BKC is generated first thereby, the CLK_BK signal is made in phase therewith, and the initial value N0 is loaded into the main-scanning counter_BK. Thus, the operation shown in FIG. 3 is started.

In a case of C (subsequent color component), by the advancing pulse (BK) of the XDETP_BKC, that is, the synchronization detection signal caused by the BK beam, only the initial value N0 is loaded into a main-scanning counter_C, and, then, when the count value of the main-scanning counter_C becomes a predetermined value Nc, the above-mentioned BC_C signal is made active. Then, the initial value N0 is loaded into the main-scanning counter_C again at the timing of a CLK_C signal made in phase by the decaying edge of the thus-generated XDPOUT_C signal. As a result, the BD_C signal is made inactive. Thereby, the LD unit 1C is turned off, and, thus, the XDETP_BKC has the "H" level. This operation is performed for each line (main scanning).

Thus, as long as the polygon mirror 4 rotates approximately at the fixed rotation velocity, the C beam emitted from the LD unit 1C and then deflected by the polygon mirror 4 is applied to the sensor 8BKC with an approximately fixed delay time from a time at which the BK beam was applied thereto immediately precedingly. Thereby, by making the BD_C signal active after counting the predetermined number (N0 through Nc) of pulses of the CLK_C so as to turning on the LD unit 1C and also to open the gate 22 for C at the same time, the C beam can be detected by the sensor 8BKC. Then, after that, by making the BD_C signal inactive (low level) immediately after the CLK_C signal is made in phase with the thus-generated low-level pulse of the XDPOUT_C signal, this AND gate 22 is closed, and, as a result, the subsequent pulse (caused by the beam BK) of the XDETP_BKC is not taken as the XDPOUT_C.

As shown in FIG. 3, a flag FLG_C signal is provided. Then, as shown in the figure, a configuration is made such that the LD turning-on signal BD_C is made active when the FLG_C signal is in an L level, and, also, the main-scanning counter_C has the count value Nc. Further, when the main-scanning counter_C has the value Nc, the FLG_C is set to an H level simultaneously. Then, when the main-scanning counter_C is initialized to N0, the BD_C signal is made inactive. Then, counting is proceeded with, then, when the main-scanning counter_C has the value Nc again, as the FLG_C signal has the H level, the BC_C signal does not come to be made active, and, thus, the LD of C is not turned on thereby. Then, counting is proceeded with, then, when the main-scanning counter_C has a predetermined value Nf, the FLG_C signal is returned to the L level. Thus, preparation for a process for the subsequent line is made. Thus, by the status of the FLG_C signal, the operation of the BD_C is managed. Thereby, the BD_C signal is prevented from being made active at an unintended timing.

Then, by using an appropriate count value of the main-scanning counter_C, image data is sent out from the main/sub-scanning timing control part 302 of the LD control part 210C in proper timing as mentioned above.

The output of each separating circuit 304 (23BK, 23C, 23M or 23Y) is provided to the main/sub-scanning timing control part 302 of a respective one of the LD control parts 210BK, 210C, 210M and 210Y. This output may include a flag for detecting whether or not the synchronization detection signal is properly input. FIG. 7 shows the timing chart of operation concerning this flag (PMMNT flag). The PMMNT flag is set to "H" level while the XDPOUT signal (XDPOUT_BK, XDPOUT_C, XDPOUT_M, or XDPOUT_Y) is properly output, and, is reset to "L" level by a flag reset signal (XFLGRST) from the controller 200, or the like, shown in FIG. 4. Accordingly, when the XDPOUT signal comes to be not output, the PMMNT flag always has the "L" level after that. For example, by performing the flag reset operation by the XFLGRST signal and an operation of reading the PMMNT flag by a period of once per 10 lines (scanning), it is possible to recognize an error/lack of the synchronization detection signal.

For example, by reading the PMMNT flag for two color components of black and cyan (BK and C, and, thus, PMMNT_BK flag and PMMNT_C flag), and, according to a combination thereof, it is possible to determine which color component has an error in synchronization detection signal, as shown in FIG. 8.

However, a case where an abnormality of C occurs and then an abnormality of BK occurs, as shown in FIG. 9 will now be considered. In this case, according to the configuration described above, as AND logic between the XDETP_BKC signal and each of the BD_BK and BD_C signals is examined, the PMMNT_BK flag and PMMNT_C flag erroneously show a normal operation, as shown in FIG. 9. Thus, it is not possible to properly detect an error in synchronization detection signal.

In order to solve this problem, according to the present invention, as shown in FIG. 10, at a time of occurrence of an abnormality of BK (abnormality of the advancing color component), the synchronization detection signal of the subsequent color component is made to be not output. In the present invention embodiment, a value Nce corresponding to a time interval shorter than the line period T shown in FIG. 2 is set for the main-scanning counter_C, and the BD_C signal is forcibly made to have "L" level when the count value of the main-scanning counter_C exceeds this value Nce. Thereby, as shown in FIG. 10, no synchronization detection signal (XDPOUT_BK, XDPOUT_C) is output after that until the synchronization detection signals are output properly. Thus, it is possible to properly detect an error even when an abnormality of C occurs and then an abnormality of BK occurs, for example.

Further, for the separating circuits (304) 23BK and 23C shown in FIG. 6, for example, a demand may be made such that each separating circuit can be used both for a single beam (scanning) system and a well-known multi-beam (scanning) system, for saving costs. Therefore, according to the present invention, for each separating circuit 304, the number of beams which are used simultaneously in scanning for each color component is set, and, thus, by changing the setting, each separating circuit can be used for both a single-beam system and a multi-beam system. According to the present invention, by setting an LDNUM signal shown in FIG. 6, switching between 1-beam system and 2-beam system can be made. When the LDNUM signal has "H" level, the separating circuit is used for 1-beam system. When the LDNUM signal has "L" level, the separating circuit is used for 2-beam system.

FIG. 11 shows the timing chart of operation of beginning of writing of one line (main scanning) in a case of 2-beam system. Names of two beams for each color component are referred to as BK_LD0 and BK_LD1, or C_LD0 and C_LD1, for example, and, in this system, assuming that a series of pulses are output along a time axis, AND logic with the synchronization detection beam-turning-on signal of each beam, which is generated in timing according to an appropriate count value of a respective counter, for example, is examined, same as in the case of single beam system, and, thus, separation of color components, and separation of two beams of each color component are performed sequentially.

Further, the above-described method of detecting an error in synchronization detection for the single beam system may also be applied to a multi-beam (scanning) system, and, thereby, it is possible to detect as to which color component has an error, and which beam of the color component has the error, accordingly.

Further, the present invention is not limited to the above-described embodiments, and variations and modifications may be made without departing from the scope of the present invention.

The present application is based on Japanese priority application No. 2000-245089, filed on Aug. 11, 2000, the entire contents of which are hereby incorporated by reference.

What is claimed is:
1. A light beam scanning device for scanning a recording medium by a light beam so as to perform recording of information thereon, comprising:
   a synchronization detecting sensor to which light beams of a plurality of colors are applied with difference in time;

a signal generating part which generates a signal which is active only during an interval of taking one pulse of a series of output pulses of said synchronization detecting sensor, but is not active during an interval of taking more than one pulse thereof; and a signal separating part which separates a synchronization detection pulse for each color only when the signal generated by said signal generating part is active.

2. The device as claimed in claim 1, wherein the signal generated by said signal generating part comprises a synchronization detection beam-turning-on signal for each color.

3. The device as claimed in claim 2, wherein:

the synchronization detection beam-turning-on signal for the advancing first color becomes active when a first main-scanning counter counts a first predetermined number, and, becomes inactive when an initial value is loaded into said first main-scanning counter by the synchronization detection pulse corresponding to the first color; and by the synchronization detection pulse corresponding to the first color, a second main-scanning counter for the subsequent second color is loaded with the initial value, and the synchronization detection beam-turning-on signal for the second color becomes active when said second main-scanning counter counts a second predetermined number, and, becomes inactive when the initial value is loaded into said second main-scanning counter by the synchronization detection pulse corresponding to the second color.

4. The device as claimed in claim 3, wherein, while the synchronization detection pulse corresponding to the subsequent second color is not output, the second synchronization detection beam-turning-on signal is made inactive when said second main-scanning counter counts a predetermined error-detection number.

5. The device as claimed in claim 1, wherein said separating part is provided for each color, and has a same circuit configuration, and, each separating part has information externally set for indicating an order of the colors in the series of pulses output from said synchronization detecting sensor so as to take a pulse thereof corresponding to a respective one of the colors.

6. The device as claimed in claim 5, each separating circuit outputs synchronization detection pulses selectively of one of a single-beam system and multi-beam system according to a set number of beams.

7. The device as claimed in claim 1, wherein a beam of which color has an error is detected by using the synchronization detection pulse corresponding to each color.

8. The device as claimed in claim 7, wherein, when the synchronization detection pulse corresponding to the advancing first color has an error, the synchronization detection pulse corresponding to the subsequent second color is prevented from being output.

9. A light beam scanning device for scanning a recording medium by a light beam so as to perform recording of information thereon, comprising:

synchronization detecting means to which light beams of a plurality of colors are applied with difference in time;

signal generating means for generating a signal which is active only during an interval of taking one pulse of a series of output pulses of said synchronization detecting means, but is not active during an interval of taking more than one pulse thereof; and signal separating means separating a synchronization detection pulse for each color only when the signal generated by said signal generating means is active.

10. The device as claimed in claim 9, wherein the signal generated by said signal generating means comprises a synchronization detection beam-turning-on signal for each color.

11. The device as claimed in claim 10, wherein:

the synchronization detection beam-turning-on signal for the advancing first color becomes active when a first main-scanning counter counts a first predetermined number, and, becomes inactive when an initial value is loaded into said first main-scanning counter by the synchronization detection pulse corresponding to the first color; and by the synchronization detection pulse corresponding to the first color, a second main-scanning counter for the subsequent second color is loaded with the initial value, and the synchronization detection beam-turning-on signal for the second color becomes active when said second main-scanning counter counts a second predetermined number, and, becomes inactive when the initial value is loaded into said second main-scanning counter by the synchronization detection pulse corresponding to the second color.

12. The device as claimed in claim 11, wherein, while the synchronization detection pulse corresponding to the subsequent second color is not output, said second synchronization detection beam-turning-on signal is made inactive when said second main-scanning counter counts a predetermined error-detection number.

13. The device as claimed in claim 9, wherein said separating means is provided for each color, and has a same circuit configuration, and, each separating means has information externally set for indicating an order of the colors in the series of pulses output from said synchronization detecting means so as to take a pulse thereof corresponding to a respective one of the colors.

14. The device as claimed in claim 13, each separating means outputs synchronization detection pulses selectively of one of a single-beam system or a multi-beam system according to a set number of beams.

15. The device as claimed in claim 9, wherein a beam of which color has an error is detected by using the synchronization detection pulse corresponding to each color.

16. The device as claimed in claim 15, wherein, when the synchronization detection pulse corresponding to the advancing first color has an error, the synchronization detection pulse corresponding to the subsequent second color is prevented from being output.

* * * * *